(12) United States Patent
Istvan et al.

(10) Patent No.: US 7,870,125 B1
(45) Date of Patent: Jan. 11, 2011

(54) INTEGRATED MEDIA CONTENT SERVER SYSTEM AND METHOD FOR THE CUSTOMIZATION OF METADATA THAT IS ASSOCIATED THEREWITH

(75) Inventors: Anthony F. Istvan, Parker, CO (US); Bruce F. Bahlmann, Philadelphia, PA (US)

(73) Assignee: Charter Communications Holding Company, St. Louis, MO (US)

( * ) Notice: Subject to any disclaimer, the term of this patent is extended or adjusted under 35 U.S.C. 154(b) by 169 days.

(21) Appl. No.: 11/320,447

(22) Filed: Dec. 27, 2005

(51) Int. Cl.
*G06F 7/00* (2006.01)

(52) U.S. Cl. .................. 707/722; 707/899; 709/229; 709/231; 709/235

(58) Field of Classification Search .................. 707/100
See application file for complete search history.

(56) References Cited

U.S. PATENT DOCUMENTS

| | | | |
|---|---|---|---|
| 5,548,338 A | 8/1996 | Ellis et al. | |
| 5,861,906 A | 1/1999 | Dunn et al. | |
| 6,005,561 A | 12/1999 | Hawkins et al. | |
| 6,031,577 A | 2/2000 | Ozkan et al. | |
| 6,421,726 B1 | 7/2002 | Kenner et al. | |
| 6,484,199 B2* | 11/2002 | Eyal | 709/223 |
| 6,614,843 B1 | 9/2003 | Gordon et al. | |
| 6,904,609 B1 | 6/2005 | Pietraszak et al. | |
| 2004/0003097 A1* | 1/2004 | Willis et al. | 709/228 |
| 2004/0199657 A1* | 10/2004 | Eyal et al. | 709/231 |
| 2005/0138137 A1* | 6/2005 | Encarnacion et al. | 709/217 |
| 2005/0141864 A1* | 6/2005 | Sezan et al. | 386/69 |

* cited by examiner

*Primary Examiner*—Debbie Le
*Assistant Examiner*—Anh Tai V Tran
(74) *Attorney, Agent, or Firm*—Marshall, Gerstein & Borun LLP

(57) ABSTRACT

A system and method for the customization of media content metadata that is transmitted to any one of a plurality of end user devices of differing types. The system is adapted to modify individual records or even individual fields from the entire gamut of available metadata into a metadata feed which is optimally suited for display upon the type of end user device. Additionally, the system is also able to modify the records or individual fields from a list of all metadata instances according to pre-recorded user preferences. The result is a system that optimally utilizes the current connection path in order to reduce congestion thereon, or to alleviate any user potential frustration caused by sporadic performance of the overloaded interconnection path.

15 Claims, 5 Drawing Sheets

INTEGRATED MEDIA CONTENT SERVER SYSTEM AND METHOD FOR THE CUSTOMIZATION OF METADATA THAT IS ASSOCIATED THEREWITH

BACKGROUND TO RELATED APPLICATIONS

Priority is not claimed to any other application.

FIELD OF THE INVENTION

The present invention relates to media content metadata associated with conventional forms of media content, and more particularly, to a novel system which provides for customization of the metadata that is transmitted to an end user device based upon various differing parameters or characteristics thereof.

BACKGROUND OF THE INVENTION

Historically, media content distribution systems that provided metadata relating to its distributed media content were typically limited to video distribution systems such as Cable Television (CATV), and Digital Broadcast Satellite (DBS) as well as a few, select terrestrial aerial broadcast systems. These video distribution systems typically incorporated the use of electronic program guides (EPGs) which were able to display informational media content metadata regarding current as well as upcoming video content from the video distribution system. The conventional EPG is basically a combination of all metadata associated with the available media content, which is organized for display to the user in an easily readable format on a display such as a television. Correspondingly, each instance of media content metadata is stored within a listing or record, wherein each listing details specific information about its associated video program. In turn, each listing contains a plurality of fields, each containing textual data and/or graphics of still images or movie trailers that provides useful information regarding the media content.

Nevertheless, many of today's media content distribution systems possess the capability of broadcasting metadata relating to various forms of media content that is distributed through its network. For example, broadcast distribution systems such as radio have implemented a radio data system (RDS) type protocol whereby metadata or other informational content relating to the currently aired program or song is displayed on a display for the user. This RDS protocol is implemented via a relatively small amount of bandwidth that is honed from the total bandwidth of the broadcasted audio signal and is transmitted alongside its associated radio program content. This relatively small bandwidth is adapted to convey metadata in the form of textual information for immediate display for the user. Throughout this specification, the term "bandwidth" is defined to mean a bit rate capacity of a predetermined transmission medium. Other forms of media content metadata that are not sent in-band with associated program content but are accessed independently include the Internet Movie Database (IMDb), and digital music metadata. This digital music metadata may contain information such as lyrics, composer, artist, and the like. Thus it may be seen that currently many different forms of content metadata are available and the media content distribution networks have the capability of broadcasting metadata which is informational to the consumer of its related media content. Media content metadata is defined within this specification to be any data such as text, sound file, movie trailer, box art, image, review, and the like that is associated with media content that can be streamed, transmitted via unicast IP, broadcasted, or played locally on an end user device. Moreover, throughout this specification, the term 'broadcasting' may include any known means of disseminating the metadata to one or more end user devices such as by multicasting, carouselling, and the like.

The early video distribution systems typically utilized an end user device such as a set top box (STB) that was capable of receiving media content and its associated metadata from the network and transforming these into commonly used ATSC, NTSC, PAL, or SECAM formatted signals for use by a display such as a television set. Nevertheless, burgeoning network topologies such as the Internet, cellular networks, satellite networks, wireless networks, and telephonic networks such as the public switched telephone network (PSTN) have enabled numerous types of end user devices to be capable of receipt and display of pertinent forms of media content metadata. There are an increasing array of devices that can access content today including traditional to very advanced STBs, televisions (TV), High Definition Televisions, (HDTVs), Super High Definition Televisions (SHDTV), other home appliances (such as refrigerators), mobile devices (cellular phones, personal data assistants, organizers, electronic calendars, hybrid phones, etc.), personal computers, laptops, game consoles, portable video units, and portable game consoles, wherein all such devices are defined as metadata aware devices due to their ability to receive and process incoming media content metadata.

Metadata generally contains information about the content that would allow the user or system to learn about the content without actually experiencing it. As described hereinabove, metadata also enables the generation of a table of upcoming or currently running media content to allow the user or system to view, record, or do something else with the content such as filter, ignore, or block it. Metadata may include comprehensive text about the media content including start time, stop time, program name, year released, theatrical rating, composer, artist, album, actors, directors, short description, long description, channel and the like, wherein there are dozens of such fields, all of which are well understood among guide data providers. Additionally, this metadata may contain other multimedia components of interest such as pictures, thumbnail images, file icons, game simulations, posters, theatrical trailers, box art (similar to packaged media art), content owner associated advertisements, content service provider associated advertisements, critic reviews, awards, and the like. While metadata is meant to be useful for individuals to know what programs are currently playing or will be playing in the near future, it is also useful for associated systems and applications used for automation, learning user interaction or habits and preference, or perhaps just providing additional information or guidance to the user. Such automated tasks include the blockage of all "R-Rated" media (content television, cable, radio programs, games, music, or art/images with mature ratings, extensions of parental control or identity management) or the recording of all instances of a particular program of interest. Without the availability of media content metadata, the aforedescribed automated features would be rendered essentially useless and the individual is forced to sample all available media content currently playing, or refer to some other piece of information such as a newspaper or some other distribution source or online guide to help them determine what types of media content are to be broadcasted.

A drawback regarding the usage of the aforedescribed media content metadata within media distribution systems is that the level of detail that each metadata record may contain is often times ill-suited for the end user device, which may use this data. In order to provide a thorough description of the media content event, providers of this metadata typically include more information than is necessary for the typical user. The negative ramifications of this modus operandi includes slow dissemination or carouselling of the metadata to the end user device, as well as superfluous usage of memory resources contained therein. While a number of methods currently exist to compress the metadata into a smaller entity that can be transmitted to the devices that require it, such methods assume that much of the available metadata available is required by the end user device. In fact, the most common model is to broadcast all available media content metadata down to the end user device and then let the metadata aware device filter what is needed regardless of its technical capabilities, bandwidth availability, or user preferences. This problem is exacerbated by the wide variety of metadata aware devices currently available in that each has differing capabilities relative to display size and resolution, as well as computer processing capabilities, all of which directly impact the level of detail of each metadata record that may optimally be used thereby.

Another drawback to currently available metadata is that metadata which is pertinent to a particular instance of media content typically doesn't reside within a single authoritative source. That is, content metadata originating from multiple metadata providers may represent a complete set of all available metadata which may be available for a particular instance of media content; however, the obtainment of such a complete set by one particular end user device has heretofore been inaccessible.

Current implementations of content metadata distribution systems have been principally adapted for use with end user devices having generally standardized display capabilities. For example, a metadata distribution system which is adapted for display of metadata on a conventional television would be substantially ill-suited for display upon a typical mobile device such as a cellular telephone. This is due to the fact that mobile devices have displays which are significantly smaller than a television screen and thus are not adapted for display of the relatively large amount of information in a similar manner thereto. What has been missing in the art is the ability to associate the relative amount of metadata that is transmitted to an end user device that is commensurate with the end user device's ability to display that metadata in an intelligible manner.

There is also an increasing issue relative to mobility. As metadata aware devices increasingly are made to roam beyond their original installed location, desirable features such as transportability, interoperability, and self-discovering capabilities become increasingly valuable. For example, if a metadata aware device roams from its usual location within an individual's home to another city, its owner may want the option to either experience content similar to their home base, see what content is available locally, or perhaps even experience a combination of the two. Regardless, the need for metadata handling capabilities in mobile devices from differing geographic locations is on the rise.

Finally an issue regarding the convergence of technologies will be noted. A single end user device may be a music player, interactive video player, smart phone, remote control, digital video recorder (DVR), computer, game console, organizer, and the like, wherein such convergence of either of these devices to another possesses serious implications on the metadata needs as well as capabilities of such a device that are not addressed by heretofore known metadata distribution systems.

A metadata feed is defined as one or more files containing data representative of content that is available to end user devices. The data within the feed may consist of records, each having one or more fields of textual or multimedia information, which could be represented in many different formats including ASCII, binary, etc. and is typically transmitted separately from the content that it represents as an in-band signal or an out-of-band signal.

SUMMARY OF THE INVENTION AND OBJECTIVES

The present invention is directed to a novel media content metadata distribution system that tailors the level of detail of each metadata record in correspondence to an interconnected metadata aware device that requests or requires such data. In a metadata distribution system in which metadata may be served to differing types of end user devices upon specific request therefor, the system is capable of detecting various aspects of the requesting device in order to form a minimum optimal set of fields that are transmitted in each record in order to alleviate bandwidth requirements through the transmission medium as well as to reduce the storage requirements of the metadata within metadata aware devices while optimizing the usefulness and display of metadata across a varied capability end user device. The system is operable within a distribution network which provides for the dissemination of media content and its associated media content metadata.

Upon receipt of a request for media content metadata from a client metadata aware device, the system is operable to detect such aspects of the device such as the type of device, the network with which the device is interconnected, the present line performance of said network, the geographic location of the device, and any specific user-associated preferences. Having knowledge of these criteria, the system is then able to deliver an optimal set of metadata suitable for transmission to the end user device. The optimal set of content metadata fields provided will be tailored to the end user device or group of devices which the requesting device is represented, and could represent all available content metadata fields for high-end devices, or an abbreviated or truncated collection of content metadata fields for middle or lower end devices.

One aspect of the present invention is the bandwidth preservation provided thereby. The older, legacy metadata distribution systems operated in a one-way environment, whereby large amounts of metadata were periodically broadcasted to many client user devices. However, newer distribution networks having two-way or upstream communication easily create the possibility of "network storms", wherein a "network storm" is defined as a relatively short momentary burst of user requests necessitating responses that can not be handled properly due to the limited capabilities of the transmission medium. Given these newer two-way networks, the requirement of alleviating unnecessary transmission of superfluous data is paramount. The present invention provides a solution to this need by abbreviating the amount of metadata that is transmitted to the client device to only that data which conceivably would be useful to the user or what is immediately needed. For example, a subset of all available metadata comprising only several days worth of information may be transmitted in lieu of the conventional one to two weeks worth of metadata.

Another aspect of the present invention is a central repository for user preferences over diverse types of metadata aware devices. Newer technologies have enabled the receipt and use of metadata to various types of user devices by a single user.

Although the user may have access to differing types of user devices over a period of time, his or her preferences generally do not change as rapidly. The system of the present invention allows the user to maintain user preferences in one accessible database thereby easing the creation and maintenance of metadata preferences. For example, identity management or parental control settings may establish account wide restrictions over any end user device associated with such a primary user of this account.

Yet another aspect of the present invention is metadata which is highly tailored to match the capabilities of diverse types of metadata aware devices. As it is well known that differing metadata aware devices have capabilities which can vary greatly, the present invention provides a solution to this need by tailoring the transmitted data, thereby allowing the client device to optimally format the metadata to the display as well as to make optimal use of memory and processing resources therewithin. The characteristics of the end user device that may be made available to the system may include such characteristics such as processing capabilities, minimum memory allocation, operating system, or even preferred metadata data structure type. For example, the system may be adapted to identify a preferred data format which is used by a metadata display application that is executed on the end user device. Whereas it is known that metadata display algorithms that are executed on the end using open structured languages such as C or C++ do not require encapsulation of data within objects, a customized metadata feed may be created that uses this characteristic to optimally compress the metadata to its smallest size. On the other hand, other metadata display algorithms using object structured languages such as Java preferably utilize data which is store in objects, wherein another customized metadata feed may be created which contains fields stored as objects. Thus is may be clearly seen that the present invention provides for enhanced customization of metadata format that is ultimately transmitted to the end user device based upon that device's characteristics.

It is therefore an object of the present invention to provide a metadata distribution system that optimizes the metadata that is sent to a metadata aware device.

Another object of the present invention is to provide a means of catering the content metadata provided to the end user device based on the capability of the end user device to display such information.

Another object of the present invention is to provide a metadata distribution system that reduces the effective bandwidth required to transmit listings data through a transmission medium.

Another object of the present invention is to provide a metadata distribution system that enables the efficient dissemination of media content metadata to varied types of end user devices.

Another object of the present invention is to provide a metadata distribution system that optimally preserves the throughput of data through a transmission medium by tailoring the level of metadata to the type and current performance of a transmission medium.

Another object of the present invention is to provide a metadata distribution system that tailors the type of metadata transmitted to an end user device based upon user specified preferences.

Another object of the present invention is to provide a metadata distribution system that optimizes media content metadata to be received by a user based upon the user's current geographical location.

These and other objects of the present invention will become readily apparent to those familiar with video distribution networks and will become apparent in the following portions of the specification, wherein the detailed description is for the purpose of fully disclosing preferred embodiments of the invention without placing limitations thereon.

BRIEF DESCRIPTION OF THE DRAWINGS

The accompanying drawings, which are included to provide a further understanding of the invention, illustrate embodiments of the invention that together with the detailed description thereof serve to fully explain the principles of the invention, wherein.

DETAILED DESCRIPTION OF THE PREFERRED EMBODIMENTS

Figure 1:
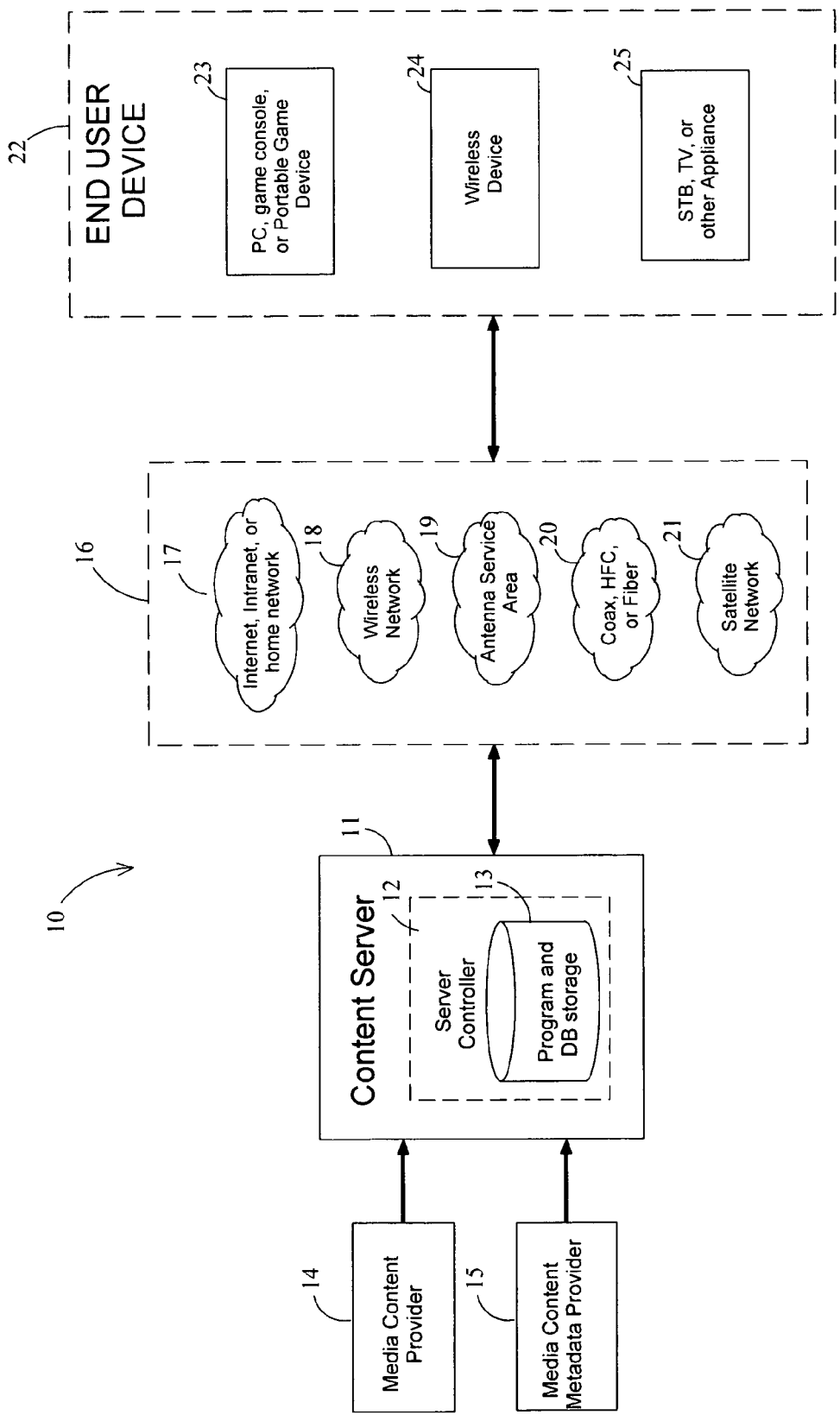
FIG. 1 is a block diagram of an exemplary network topology of the video distribution system of the present invention.

Referring now to the drawings, FIG. 1 shows a diagrammatic representation of the essential components of an exemplary media content metadata distribution system 10 having two-way capabilities. A two-way distribution system is defined as the ability of a media content server to receive and process upstream requests from a distally located end user device in order to manipulate metadata which is sent downstream to the device corresponding to those requests. The media content metadata distribution system generally comprises a content server 11 such as a data center, which processes media content and its associated metadata emanating from at least one media content provider 14 and at least one media content metadata provider 15 respectively, and forwards this media content and associated metadata onward to an end user device 22 via any one of a number of differing types of network topologies 16. Preferably, the content server 11 is capable of processing media content metadata from several differing types of metadata providers including video content, audio content, and data content for dissemination to the end user device 22.

Media content metadata containing information regarding upcoming as well as currently ongoing media content, is provided by at least one media content metadata provider 15 or main facility via satellite, through a data network such as the Internet, or any other well known means. Preferably, the media content metadata provider 15 may be a plurality of content metadata providers although only one is shown in the drawing for clarity. As mentioned hereinbefore, the list of available media content metadata providers may include video distribution providers, metadata providers interconnected to the Internet such as the Internet Movie Database (IMDb), other assundry online guide listings, and Radio Data Systems (RDS) protocols. it is well known that metadata pertinent to a particular instance of media content may originate from several differing metadata distribution systems. For example, information regarding a particular type of media content such as a theatrical movie may exist on a conventional CATV distribution system as well as from the Internet. The system of the present invention incorporates the ability to combine pertinent fields from each metadata source in order to formulate a customized metadata feed which is optimized for use by a type or group of end user devices based on predetermined characteristics thereof. A customized metadata feed is herein defined as a subset of all metadata records from a plurality of uncustomized metadata feeds. Wherein the uncustomized metadata feeds may be provided by any of the aforementioned media content metadata providers 15, the customized metadata feed may include portions of metadata from any or all available providers.

All metadata is compiled at the media content metadata provider's facility and then forwarded on to the content server for temporary storage within the program and database storage 13. A server controller 12 is operable to administer the processes within a data center or head end including the dissemination of metadata to at least one of an end user device 22 in either a response to a specific request by the user or periodically in a broadcast, carousel, or multicast, type fashion. The metadata, which is transmitted to the content server, may contain a plurality of fields such as program titles, program times, channels, ratings, and the like, or other multimedia components of interest such as pictures, thumbnail images, file icons, posters, theatrical trailers, box art, content owner associated advertisements, content service provider associated advertisements, critic reviews, awards, and the like. In addition to serving media content and its associated metadata, the exemplary media content server is preferably capable of administering subscription authorization to users of the system. That is, the server is capable of identifying a particular user that has issued a request for media content and/or its associated metadata in order to determine if that user has a predetermined right to access the requested content.

Newer networking technologies have enabled the interconnection of various networks 16 such as the Internet, intranet, and home networks 17, wireless networks 18, video distribution networks utilizing Coax, Hybrid Fiber Cable (HFC) 20, and satellite networks 21 to a common distribution plant. Utilizing a service provider gateway, end user devices 22 that are interconnected to various types of network topologies may be served by the media content server 11. Additionally, legacy aerial transmission services 19 may also be served by the content server. That is, the necessity of providing separate and distinct cabling network structures throughout a demographic area has been abated. One type of protocol that has been developed for the purpose of allowing such connectivity is a version of the Data Over Cable Service Interface Specification (DOCSIS). The DOCSIS protocol provides enhanced support for video content transports (video transmission), data connectivity (Internet), as well as connection to a telephonic network such as the public switched telephone network (PSTN). Transmission of media content may be accomplished by encapsulating a version of motion picture experts group (MPEG) packets within an Internet protocol (IP) frame via a service provider gateway, wherein the MPEG type packetized architecture is a form of digitized video compression protocol suitable for the transmission of media content. Thus, varied types of end user devices within the home may be adapted to process metadata as well as its associated media content directly from the content server 11. Thus, it may be clearly seen and is well known in the art, that many differing types of end user devices, which are each interconnected to varying types of network topologies, may issue requests for and receive media content metadata from the content server 11.

The exemplary media content metadata distribution network 10 is adapted for the dissemination and transmission of a plurality of metadata to a large plurality of differing types of end user devices 22 such as personal computers, gaming consoles, portable gaming devices 23, wireless devices 24 such as cellular telephones, or even set top boxes or other appliance having interactive display capabilities 25. In practice, the distribution network 10 of the present invention is adapted to supply broadcast media content and other related services to a large quantity of customers although only one of each type is shown in the drawing for clarity. End user device 23 may be any type of computing device, which has the ability to process and display video content and its associated metadata, may provide a valid substitute. Several examples may include personal digital assistants (PDAs), laptop computers, portable media devices, smart watches, and gaming stations. Additionally wireless devices 24 such as cellular telephones, Internet enabled telephones, video telephones that are capable of processing media content broadcast offerings over the telephonic or cellular network may also be utilized with the teachings of the present invention.

User interaction with the system of the present invention is preferably accomplished via a user input for input of individual keystrokes, in conjunction with a display such as a television, liquid crystal display (LCD), thin film transistor (TFT), or cathode ray tube (CRT) screen that provides the user with visual feedback in the form of a graphical user interface (GUI). The GUI may comprise one or a plurality of screens or layers of a single screen, each having a plurality of actuatable buttons which may be alternatively actuated by the user. Alternatively, specific buttons on the end user device 22 may be provided, which are dedicated to the actuation of a particular option button. Nevertheless, it is to be understood that the foregoing example is merely an exemplary configuration of a suitable user interface; other user interfaces are well known in the art and thus may be substituted accordingly without deviating from the spirit or scope of the present invention, such a personal computer having a keyboard for user input.

Figure 2:
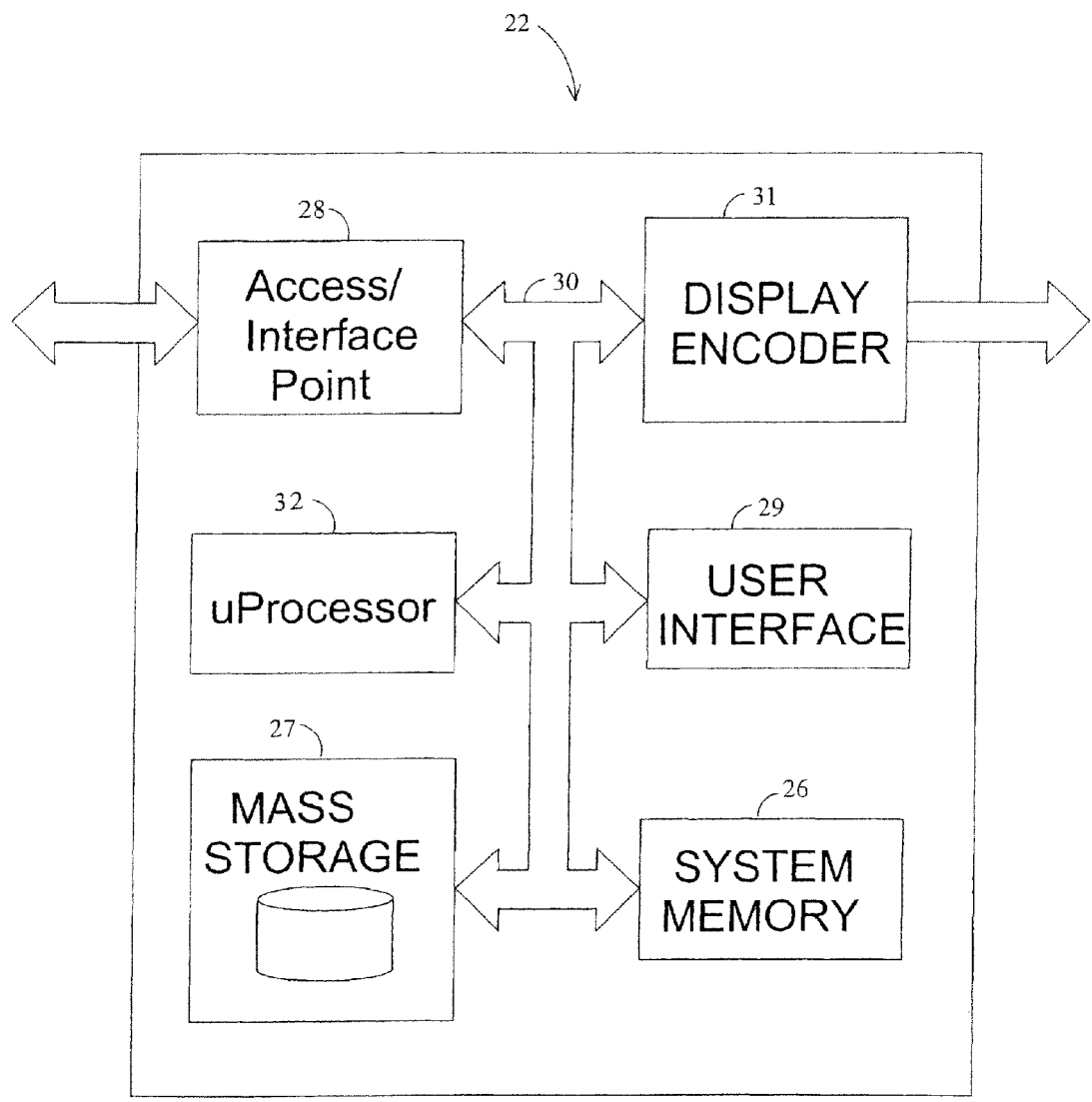
FIG. 2 is a block diagram of the essential components of a typical end user device of the present invention.

FIG. 2 shows a generic diagrammatic view of the essential components of a typical end user device 22. The end user device generally comprises a programmable micro-processor 32, non-volatile Read Only Memory (ROM) and volatile Random Access Memory (RAM) comprising the system memory 26, optional mass storage 27, a network interfacing access/interface point 28, user interface 29, and display encoder 31, which are all interconnected together via multi-conductor bus 30. The network interface point 28 decodes digital streaming media content from the content server 11 and forwards this media content to the display encoder 31. The network interface point 28 is also responsive to processor 32 in order to request and receive media content and its associated metadata from the content server. The ROM contains executable programming instructions that are perennially persistent and serve to bootstrap the end user device directly after initial power on. The RAM contains volatile memory which may be populated with various executable instructions that may be served from a conventional carousel (not shown) resident within the content server 11. An optional mass storage device 27 is also included for the non-volatile storage of user modifiable media content within the device 20. The mass storage device 27 may be comprised of a magnetic or optical disk, electrically erasable programmable read only memory (EEPROM), battery backed-up RAM, or any other similar mechanism that enables the non-volatile storage of micro-processor readable data, wherein the data stored in said mass storage device 27 is easily modified by the micro-processor 32 during use. The aforedescribed end user device may exist as a dedicated unit or a box that is adapted for placement proximate a conventional display or form an integral part of a display such that the components (32, 26, 27, 28, 29, 30 and 31) exist within the enclosures of the display 22. Additionally, it is contemplated that the components (32, 26, 27, 28, 29, 30 and 31) may also from an integral part of other components such as a Personal Video Recorder (PVR), personal computer, or similar type device. Thus, the end user device together with other associated entertainment equipment such as televisions, PVRs, or personal computers comprise a type of end user device that may be utilized with the present invention.

The present invention provides a system for the customization of metadata that is transmitted to the end user device in a periodical fashion, or in response to a specific user request. Among other things, this customization of metadata serves the purpose of reducing the overall bandwidth required for transmission through any given network 19. There are preferably several optional customization schemes that may be applied to the raw metadata, which is temporarily stored within the program and database storage 13. The types of metadata customization schemes may include means to filter the raw metadata according to at least one of a plurality of characteristics of the end user device such as user preferences, end user device type, device interconnection type, connection performance, device location; each of which is to be described in detail hereinbelow. Utilizing one or all of these varying types of schemes, media content metadata may be transmitted to a client end user device 22 in such a manner that optimally preserves the limited bandwidth resources of a typical media content distribution network.

Each of the differing types of media content have established a unique format or organization of informational data of its associated metadata, which is preferably pertinent to that particular form thereof. That is, the type of informational data contained within a particular metadata record has been optimized for use with its associated media content. For example, media content metadata associated with a popular song may contain the title, song lyrics, published date, and the like. Video content on the other hand, may contain other information that is more pertinent to its type such as title, rating, run time, and such. In either case, each metadata instance which is associated with a particular instance of media content will contain a plurality of individual fields that is capable of uniquely characterizing its associated media content.

Figure 3:
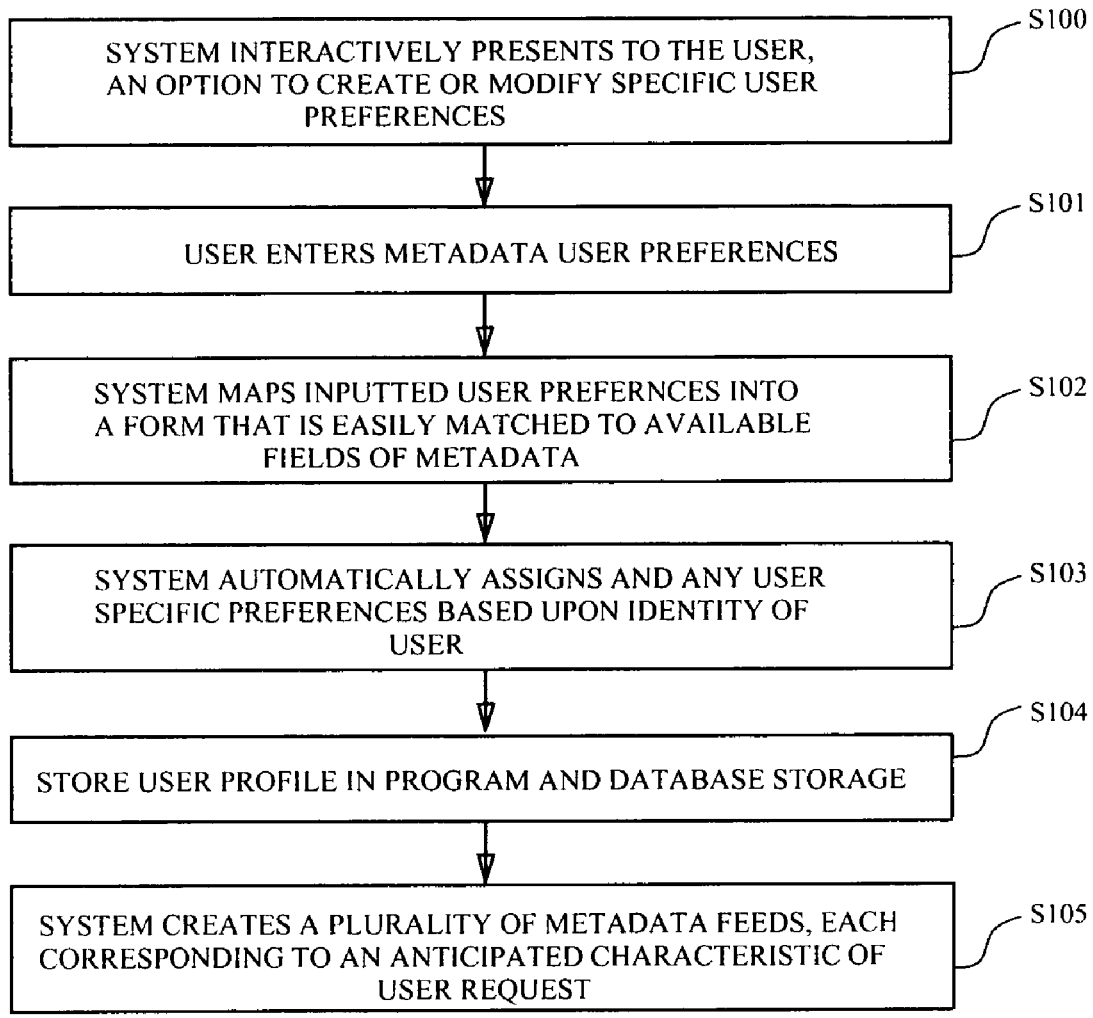
FIG. 3 is a flow diagram of a method for recordation of user preferences and creation of a plurality of metadata feeds by the system.

One optional scheme for the recordation of user preferences is shown in the flowchart of FIG. 3. Using this scheme, user preferences that are manually inputted by the user allow the system to process ensuing requests for metadata to filter unwanted or undesirable metadata that would not be of interest. The administration of user preferences may be accomplished manually in response to direct user input, or automatically based upon the identity of the user (e.g. parental controls engaged by user's parent). Manual administration of user preferences may include the setting of parental control rights, genre preferences, or other similar type attributes that may be associated with current metadata implementations.

Automatic administration of user preferences may be accomplished via varying means such as Digital Rights Management (DRM). Current implementations of DRM include the ability to control access to varied forms of media content such as video programs, textual documents, music, books, and even eCommerce. It is important to note that the DRM standard is not only limited to the control of media in a digitized format; DRM may also be enabled to control access to digital media as well as older, legacy analog media. DRM systems provide for the purchase of media content as well as controls its use according to any licensing agreements associated with that particular media content.

In use, the system may obtain specific user preference data from the user. This user data obtaining means may be accomplished in several different ways, either by an interactive application residing entirely on the end user device 22, or via a distributed fashion whereby the process is operable from the content server 11 which issues specific queries that are displayed upon the display of the end user device 22 (step S100). The type of user preference data, which is obtained by system, may include information such as name, age, address, hobbies, hours of television watched per day, as well as other objective interest information such as television show preferences, movies, situational comedy (sitcom) preferences, news, sports, and the like. Additionally, user preference data may be obtained for other non-video or television type forms of metadata such as music, wherein queries may be offered by the system to request the genre of music types the user may be interested in. The selection of queries is preferably supplied to the user on the display of any end user device 22 as a sequential list of questions or by a simultaneously displayed group of questions, each having correspondingly selectable radio buttons or the like. For example, a plurality of queries may be supplied to the end user device as a webpage in hyper text markup language (HTML) or extensible markup language (XML) format. The webpage may have a plurality of entry fields, each corresponding to a query, which are displayed upon an Internet capable device such as a personal computer. In response to the system's display of user preference queries, the user enters his or her personal preferences via the user interface of the end user device (step S101).

Following receipt of the user preference data from the user, the system processes accumulated data into a form which is easily matched against the various types of metadata to be served to the end user device upon request (step S102) in order to form a user profile for that device. Additionally, the system may select one or more user preferences automatically based upon the identity of the user. (step S103). For example, channel information, or other predetermined field information associated with a metadata record may be adapted for filtering based upon any pre-agreed upon service level agreement. As to be described in detail hereinbelow, each instance of a metadata record possesses particular fields which characterizes its associated media content. The system correlates user preferences into a form which allows the system to quickly match the aforedescribed user preferences with the available types of metadata fields. After the user profile data has been processed by the system, it is stored within the program and database storage 13, whereby ensuing requests for metadata by the user enables the system to filter unwanted metadata from all of the available plurality of metadata that is eventually transmitted (step S104).

A novel feature of the present invention is the ability to combine records from differing metadata providers in order to form a customized feed comprising a plurality of customized records, which in turn, may each contain a plurality of fields which may be a superset or subset of any particular contributing record. Based upon user preferences provided by a multitude of users, the system is able to create a plurality of metadata feeds, each of which may be uniquely suited for the varying types of attributes associated with a user request (step S105). For example, one metadata feed may be created which contains the maximum amount of fields available for any particular content metadata instance, wherein this feed may be utilized upon request by end user devices such as HDTVs which possess inherent capabilities to utilize such comprehensive data. On the other hand, other metadata feeds may created which are optimally suited for use with devices having low to moderate display capabilities. Other contemplated metadata feeds may comprise subsets of all available metadata feeds based upon user preferences, connection type, connection performance, geographical location, and the like. Preferably, the system also provides for the creation of at least one default metadata feed that is adapted for usage if a sufficient match with user attributes is not found or if no user attributes are determined from the request. Such a default metadata feed would be universally acceptable on any device no matter how low its display or storage capabilities may be, thereby providing a least common denominator approach to serving metadata to an end user device.

The aforedescribed algorithm is created using conventional software programming techniques that may be programmed using languages such as Java, C, C++ or any suitable conditional programming language. The algorithm may be executable upon any end user device 22 or may be executable in a distributed mode whereby the content server 11 shares processing responsibilities with the end user device in a server-client relationship.

The aforedescribed user preference scheme enables filtering of the requested metadata on a field-by-field basis or by filtering entire unwanted metadata records. Using the differing created metadata feeds, each of a plurality of fields from each of the plurality of metadata records, which are transmitted to a user in response to a specific request, may be filtered to suit the end user device's capabilities as well as desires. In addition to the capability of filtering unwanted fields from metadata, the system also provides the capability of filtering unwanted or unnecessary records from the plurality of metadata records that are transmitted upon each request for metadata from the user.

Figure 4:
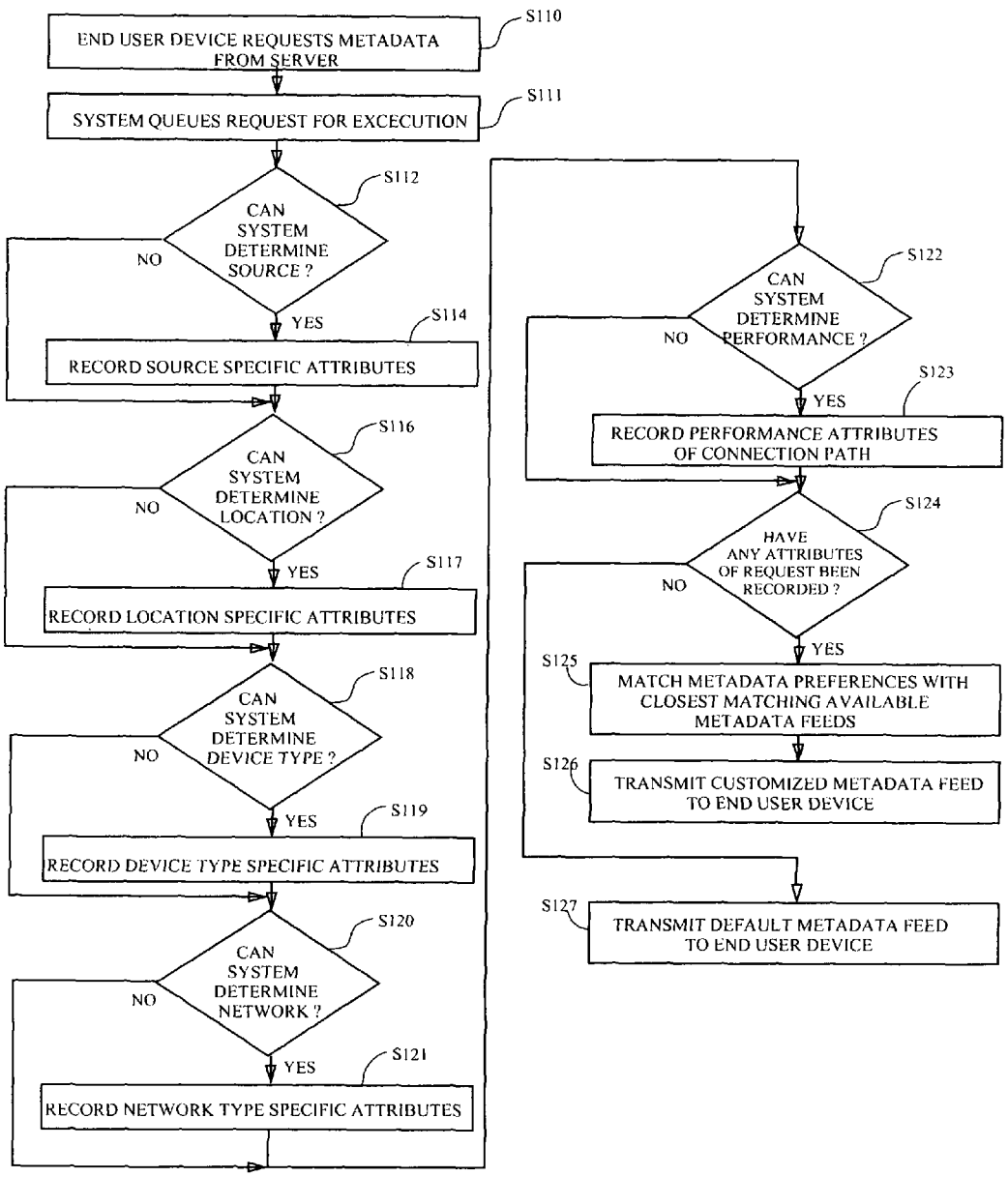
FIG. 4 is a flow diagram of a method for customizing metadata that is eventually transmitted to the end user device.

The flowchart as shown in FIG. 4 depicts the sequential operations that are taken by the system in response to a specific request for media content metadata from the content server 11. As will be described, several different type of schemes may be optionally utilized to uniquely customize the types of metadata instances that are transmitted to the user in response to a specific request. Initially, an end user device 22 issues a request for a specific type of content metadata (step S110). This request may contain a request for any type of metadata that is available from the content server 11. For example, a portable device such as a laptop computer or PDA may request metadata in the form of video content listings data associated with conventional video content or metadata associated with a currently playing song from a radio station. As an additional example, a set top box may issue a request for detailed metadata regarding a newly released movie, which is not currently slated for broadcast by the video distribution network. Thus the system of the present invention provides for access to various types of metadata from virtually any end user device that is interconnected to content server via virtually any distribution network.

The content server next takes receipt of the request and ensuingly queues the request according to available processing throughput and current server loading (step S111). After a preferably relatively short amount of time, the system forwards the request to an algorithm that attempts to determine the source of the request (step S112). If the source of the request is identified, the system is searched for the presence of a user profile of that particular user and the user preferences that were recorded and compiled in steps S100 through S105 are recorded (step S114).

The user preference scheme provides the system with information that will be used for providing an optimal match with a particular customized metadata feeds from among a list of alternative customized metadata feeds, the details of which are described in detail hereinbelow. For example, the user may be concerned with the quality of video content and thus may wish to view the included reviews associated with each metadata instance. Others may not care about the reviews and therefor may have this field filtered from the metadata that is ultimately transmitted. Thus the user preference scheme provides for abbreviation of each metadata instance in accordance with a set of pre-defined user specified user preferences.

Another optional metadata filtering scheme provided by the present invention is an user location filtering scheme. Using this filtering scheme, the user would have the ability to retrieve metadata that is associated with media content available at his or her home, in spite of the fact that the user may be at a distally remote location. Moreover, the system has the ability to maintain knowledge of the home location of the user, and be capable of retrieving metadata, which is pertinent to media content proximate this locale. This particular feature of the present invention provides substantial benefit due to today's highly mobile society. In such cases where the user is away from home, the user would be able to easily view content metadata that is pertinent of keen importance thereto such as regional news, home sporting events, community events, and the like. Thus, the user would be able to maintain an active knowledge base of upcoming media content and, with means to allow the user to access the home-based media content while away, view the associated content from the distal location. In the present embodiment, it is important to note that the user is not required to view only home-based metadata; provisions are made within the user interface to allow the user to request either home-based metadata or local metadata prior to the transmission of the request thereof.

The user location filtering scheme operates in close conjunction with the user preference filtering scheme in that the identity of the user must be known prior to processing the user request for metadata. The user profile of the user, which is stored in the program and database storage 13, is queried to hopefully determine the home location of the user (step S116). Alternatively, the location of the end user device may be learned from its location similarly to the way Internet Protocol (IP) traffic is localized or regionalized, or from its reverse Domain Naming System (DNS) host name. If the home location of the user can not be determined, or the user does not wish to view home-based metadata offerings, processing of the user request continues on to the next step. Otherwise the request for home-based metadata offerings is honored and a location variable is set by the system for use by the metadata matching process (to be described hereinbelow) (step S117).

Another optional metadata filtering scheme provided by the present invention is an end user device type filtering scheme. This scheme utilizes the identity of the source of the request in order to determine the type of device that is currently being used by the user (step S118). A particular user may have several differing types of end user devices although only one user profile has been created therefor. The present invention provides a solution to this need by enabling the customization of the type of fields within each metadata record that is sent to the end user device. The source of the request may determine the type of end user device 22 that issued the request as well as the identity of the user who made the request. Identification of the type of end user device enables the system to uniquely tailor the format of the requested metadata into a form which is most closely suited for use thereby. Thus, devices such as cellular telephones or PDAs having limited display capabilities would receive only the types of data that is suitable for display within a relatively small display area. End user devices having larger display capabilities on the other hand, would be available to receive relatively large amounts of metadata, which is relatively detailed in nature. Thus, if the system is capable of determining the end user device type, this is recorded for later use (step S119). The device type may include several characteristics of the end user device such as display capabilities, type of operating system, metadata display algorithm type, and preferred data structure.

Next, the system may attempt to determine the type of network that the end user device 22 is interconnected to, thereby defining a connectivity type filtering scheme. Whereas it is known that particular types of transmission networks such as the various aforedescribed network types each have individual nuances that tend to affect the amount of data throughput that may be accomplished at any given point in time, the system provides a means of further "throttling" the amount of data which is transmitted therethrough, thereby alleviating the potential for overload of the subject transmission network. For example, end user devices interconnected to the content server via a video distribution network have a relatively large bandwidth capacity and thus abbreviation of the transmitted metadata would not affect any significant advantages. Other networks such as a data network which interconnects the end user device to the content server via a conventional dial-up modem would benefit greatly from any abbreviation of the metadata in order to lessen the amount of data that must be transmitted.

In order to implement the connectivity type filtering scheme of the present invention, the system examines the incoming request in order to hopefully determine the network to which the end user device is interconnected (step S120). If the connection type is determinable, the system then records this information for later use (step S121).

Another optional metadata filtering scheme provided by the present invention is a connection performance filtering scheme. Although somewhat similar to the previously described connectivity type filtering scheme in the fact that a general assessment of prospective overall throughput may be obtained, the connection performance filtering scheme enhances the ability of the system to more accurately assess current performance characteristics of the transmission medium to which the end user device is interconnected. The connection performance filtering scheme is separate and distinct from the connectivity type filtering scheme in that logical assessments may be made according to actual current throughput in order to minimize any perceived performance limitations by the user. Additionally, the connection performance filtering scheme serves to reduce unnecessary data throughput that would otherwise impede performance of the transmission network and unduly cause congestion thereon.

Following modification of the metadata structure by the connectivity type filtering scheme, the system attempts to perform a scan of the network to which the end user device is interconnected in order to measure the approximate performance capabilities thereof (step S122). If this value can not be obtained after a relatively short period, approximately less than 600 milliseconds, this filtering scheme is skipped by the system. However once a metric for this characteristic is obtained, the system assesses this value to determine if further abbreviation of the metadata structure should be performed. If current performance of the subject network is not currently under congestion, an appropriate type of metadata feed will be transmitted to the end user device. However, if it is determined that current congestion or poor network performance of the subject network exists, the resulting metadata feed will be an attenuated set of data of what otherwise would be transmitted. Given this criteria, the system records any necessary network performance attributes which will be used later to provide a metadata feed which is suitable for transmission to the end user device (step S123).

Once the request for metadata has been processed by any or all of the aforementioned schemes, the system then determines whether any unique attributes thereof have been recorded (step S124). If any or all attributes have been recorded according to any or all of the aforedescribed filtering schemes, it along with any detailed user preferences and/or location preferences are matched against all available network metadata feeds in order to match the request to an optimal metadata from among a plurality of available metadata feeds (step S125). Additionally, entire records may be filtered against specific user preferences that may have been inputted by the user in the construction of the user profile or in preparation for transmission of the current request. In a similar fashion, the location variable is matched against all available metadata feeds to verify the availability of media content metadata from the specified locale. After the metadata feed has been fully customized according to the system, it is transmitted as a response to the user's request back to the end user device (step S126). Nevertheless, if no unique characteristic of the request has been determined, the system may then choose to transmit one of the previously created default metadata feeds to the end user device (step S127).

The process of FIG. 4 exists as one or more executable programs within the content server 11 and is written and compiled using any suitable language such as Java, C or C++, or any other suitable programming language. The executable programs are perpetually resident and active on the server to continually process incoming requests which originate from any one of the aforementioned end user devices.

Figures 5, 6:
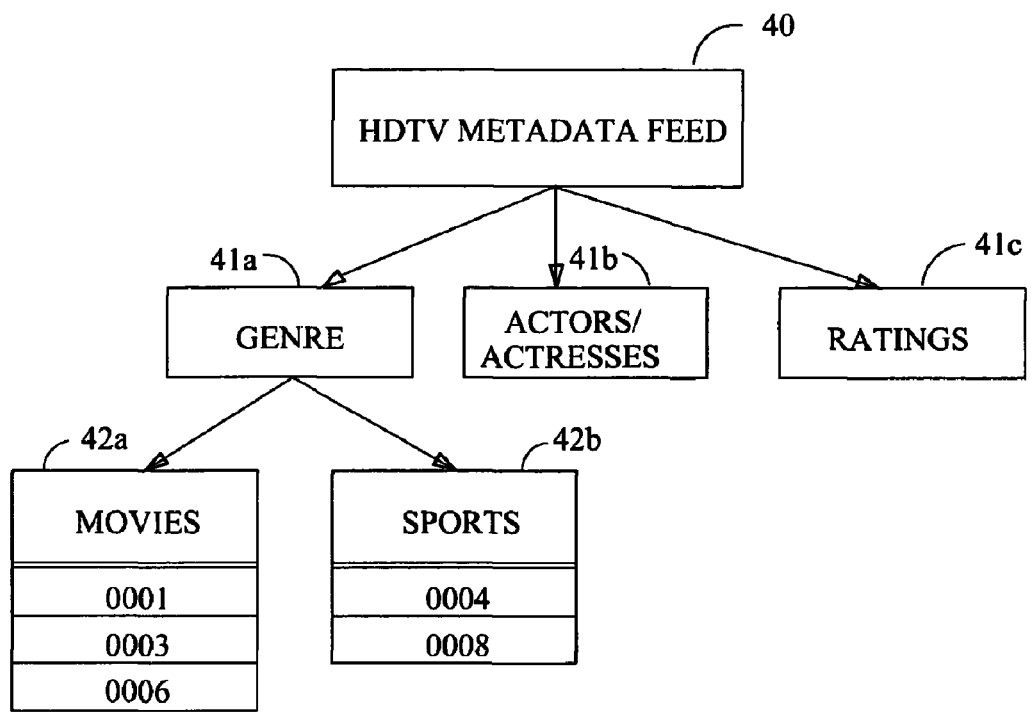
FIG. 5 is a diagram representing an exemplary Pre-sorting vector tree which is adapted for use with the present invention.
FIG. 6 is an exemplary, partial list of metadata records, each having a record vector associated therewith.

Another feature of the present invention contemplates the use of pre-sorting and pre-filtering of primary and shadow data structures, for the enablement of high performance searching, and reduction of metadata that stored within the end user device. The content server 11 typically has significantly more processing power than the end user device for the purpose of processing data. Further, data processing operations such as pre-sorting or pre-filtering are much more efficiently accomplished singularly within the server rather than within each of the many end user devices. As such, one skilled in the art may readily comprehend that maximal efficiency of metadata processing may be accomplished by providing this function within the content server. Pre-sorting trees comprise a type of hierarchal data structure for the containment and management of data in rapidly accessible form. A pre-sorted tree generally comprises a root node which may be associated with a particular metadata feed and a plurality of child nodes, each comprising at least one sorting list or leaf node. In turn, each sorting list contains vector pointers to metadata records that are pertinent thereto, wherein FIG. 5 depicts an exemplary partial pre-sorting tree. Using these pre-sorting trees, users may be able to quickly search for media content of interest using such pre-defined attributes such as media content title, genre, actor or actress, or the like.

The usage of pre-sorting trees are enabled via the aforementioned system which is capable of identifying critical information regarding the requester of the metadata. Whereas the creation and transmission of all possible pre-sorted lists to each user would be unduly burdensome, the present invention provides for an abbreviation of the quantity of existing pre-sorted lists based upon user preferences which are made known upon the request for metadata. Although any quantity of pre-sorting lists may be utilized with the teachings of the present invention, it has been determined that only a few sorting and filtering lists are sufficient for most applications. The user interface of the end user device may contain a limited quantity of selectable criteria such as program name, actors/actresses, genre type, and the like for allowing the user to iteratively search through the available plurality of metadata. Thus the type and quantity of pre-sorting lists, which are created for use with the present invention, would be adapted to closely correspond with these selection criteria that is available to the user.

FIG. 5 shows an exemplary pre-sorting tree which is adapted for use with the present invention. As shown, the root node 40 is a particular type of pre-sorting tree which is adapted for use with a HDTV type metadata feed. Also is shown, three child nodes comprising "genre" 41a, "actors/actresses" 41b, and "ratings" 41c are included which contain specific attributes about the subject metadata. It is to be understood that the three child nodes do not comprise a comprehensive list of all attributes, but rather contains only a subset of all available attributes in order to form a simplified illustration for the purposes of brevity and clarity. Additionally, the "genre" child node contains two leaf nodes entitled "movies" 42a and "sports" 42b, wherein these leaf nodes contain lists of vector pointers to metadata records that may be transmitted to, and stored in the end user device. FIG. 6 shows a partial list of metadata records 43 that may be stored within the system memory 26, or mass storage 27 of an end user device 22. Each metadata record 43 has an associated record vector 44 associated therewith. In practice, the system memory 26, or mass storage 27 of an end user device may contain numerous records, however only several are shown in the exemplary illustration.

As may be seen, the "movies" leaf node 42a contains three vector pointers, each to records as shown in FIG. 6 which are of the movie genre type. Conversely, the "sports" leaf node 42b contains two vector pointers corresponding to two records that are of the sports genre type. The "actors/actresses" 41b, and "ratings" 41c child nodes may possess child nodes, however they are not shown in the present drawing for the purposes of brevity and clarity. Each record vector may be a pointer to a specific memory location when used with an open structured language such as C or C++, or the record vector may be an offset to an object when used in conjunction with an object structured language such as Java.

The type of data structure may be any tree data structure which preferably conserves memory usage while providing ample access to the vector lists in an efficient manner. Given these criteria, a Patricia Trie is a preferred type due to its ability to provide optimal conservation of memory resources, however other tree data structures such as bucket tries, compact trees, digital search trees, and the like would each provide a viable alternative. In practice, the type of data structure used is dependent upon the nature of the task that the structure is supporting. The Patricia Trie is particularly useful for searching for titles, keywords, actors/actresses, or the like, wherein the desired item may be searched for using command completion, a computer searching process which is well known in the art. The information contained in each node defines the resulting set that matches. In the case of searching for a program title, the node can contain an offset into an array that is sorted based on program title and the number of program titles from the offset that also meet the search criteria.

In use, a pre-sorted tree is created periodically and preferably in response to receipt of new metadata from at least one metadata provider 15. All of the metadata is scanned for keywords or fields containing pertinent data in order to populate the various leaf nodes or vector lists with pertinent vector pointers. Then in response to a request for metadata from a end user device, the user preferences will be checked in order to identify a subset of all available leaf nodes that will be transmitted to the end user device 22. The subset of available leaf nodes preferably comprises information that will be most likely to be utilized by the end user device. Thus these pre-sorted leaf nodes are statically stored within the system memory, or mass storage of the end user device 22 and may be utilized thereby to quickly search for and access metadata which is stored thereon.

The present invention may be embodied in other specific forms without departing from the spirit or scope of the invention. For example, the aforedescribed embodiment utilized a metadata structure which is optimized for use with video programming content. Nevertheless, it will be appreciated by those skilled in the art that other types of metadata may make use of the present invention by merely substituting fields that are optimally suited for that particular type of media content. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A media content distribution system, comprising:
a server including a processor and a memory, the server being accessible via at least one first network topology by a plurality of different customers located in dispersed geographic locations;
wherein a plurality of media content offerings are stored in the memory of the server;
wherein a plurality of metadata records are stored in the memory of the server, with one metadata record corresponding to one of the media content offerings, each metadata record containing at least two different types of information that, when presented to a customer by means of a computing device, allow the customer to learn about the media content offering corresponding thereto without having to download the media content offering to the customer's computing device;
wherein first instructions are stored in the memory that are executable by the processor after the server receives user metadata preference information from one of the customers and that, when executed by the processor, cause the metadata preference information about that customer to be stored in the memory so that it can be separately accessible from other metadata preference information from other ones of the customers that also are stored in the memory;
wherein second instructions are stored in the memory that are executable by the processor after the content server receives a metadata record request from a customer via at least one second network topology, the second instructions, when executed,
causing the selection of the at least one metadata record corresponding to the customer request,
retrieving the metadata preference information for the customer that sent the metadata record request from the memory,
causing at least one item of information to be filtered out from the at least one corresponding metadata record based upon the retrieved metadata preference information for the purpose of lowering bandwidth requirements necessary for the server to respond to the metadata record request of the customer, and when the amount of congestion on an expected transmission path from the server to the customer over which the filtered metadata record is to be sent is above a certain threshold amount, then causing at least one additional item of information to be filtered out from the at least one metadata record for the purpose of further lowering the bandwidth requirements necessary for the server to respond to the metadata record request of the customer;

wherein third instructions are stored in the memory that are executable by the processor after the at least one filtered metadata record has been generated, the third instructions, when executed, causing only the at least one filtered metadata record to be transmitted via at least one third network topology to the computing device of the customer who sent the metadata record request thereby allowing the customer to receive the at least one filtered metadata record more quickly when the at least one second or third network topologies are congested than would be the case when the corresponding metadata record were sent to the customer without being filtered; and wherein fourth instructions are stored in the memory that are executable by the processor after the server receives a media content offering download request from a customer and that, when executed by the processor, cause the requested media content offering to be transferred to the customer by means of at least one fourth network topology.

2. The system of claim 1, wherein at least one of the at least one first, second, third and fourth network topologies comprises the internet.

3. The system of claim 1, wherein at least one of the at least one first, second, third and fourth network topologies comprises a satellite network.

4. The system of claim 1, wherein at least one of the at least one first, second, third and fourth network topologies comprises a network through which television programming is provided.

5. The system of claim 1, wherein the metadata preference information for at least one customer that is stored in the memory represents a home location of the customer that sent the metadata record request to the server.

6. The system of claim 1, wherein the metadata reference information for at least one customer that is stored in the memory represents a current location of the customer that sent the metadata record request to the server.

7. The system of claim 1, wherein the metadata preference information for at least one customer that is stored in the memory represents a type of device which issued the metadata record request.

8. The system of claim 1, wherein the at least one first network topology comprises a single communications network.

9. The system of claim 1, wherein the at least one second network topology comprises a single communications network.

10. The system of claim 1, wherein the at least one third network topology comprises a single communications network.

11. The system of claim 1, wherein the at least one fourth network topology comprise a single communications network.

12. The system of claim 1, wherein the first, second, third and fourth network topologies comprise different communications networks.

13. The system of claim 1, wherein the first, second, third and fourth network topologies comprise the same communications networks.

14. The system of claims 1, wherein at least two or more of the first, second, third and fourth network topologies comprise the same communications network.

15. The system of claim 7, wherein the type of device is selected from the group consisting of set top boxes, personal computer, personal digital assistants, telephones, Internet enable telephones, video telephones, smart watches, portable media devices, gaming stations, and laptop computers.

* * * * *

UNITED STATES PATENT AND TRADEMARK OFFICE
CERTIFICATE OF CORRECTION

| | | |
|---|---|---|
| PATENT NO. | : 7,870,125 B1 | Page 1 of 1 |
| APPLICATION NO. | : 11/320447 | |
| DATED | : January 11, 2011 | |
| INVENTOR(S) | : Anthony F. Istvan et al. | |

It is certified that error appears in the above-identified patent and that said Letters Patent is hereby corrected as shown below:

In the Claims:

At Column 18, line 23, "comprise" should be -- comprises --.

Signed and Sealed this
Ninth Day of August, 2011

David J. Kappos
*Director of the United States Patent and Trademark Office*